S. B. McMANAMIN.
CLEAN-OUT DEVICE FOR WASTE OR SOIL PIPES.
APPLICATION FILED SEPT. 21, 1914.
1,169,335. Patented Jan. 25, 1916.
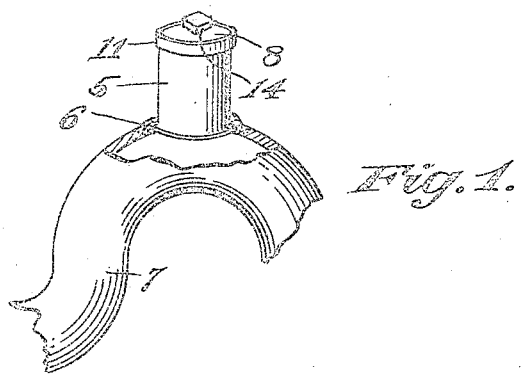
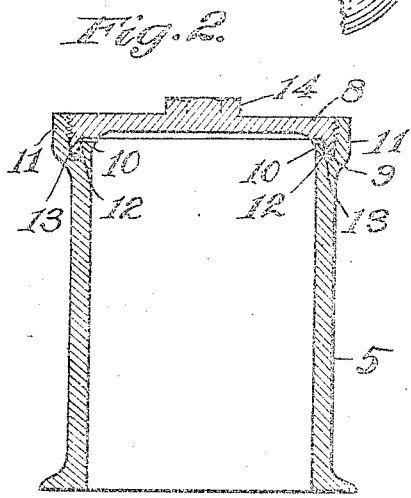
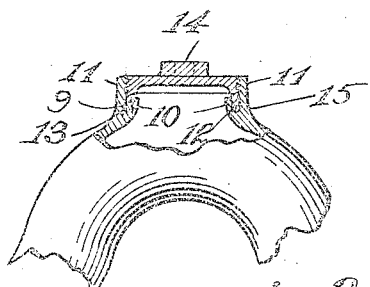
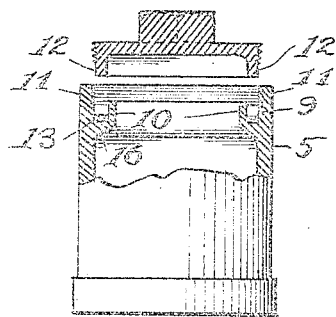

UNITED STATES PATENT OFFICE.

STEPHEN B. McMANAMIN, OF FREDERICTON, NEW BRUNSWICK, CANADA, ASSIGNOR OF ONE-HALF TO WILLIAM H. IRVINE, OF FREDERICTON, NEW BRUNSWICK, CANADA.

CLEAN-OUT DEVICE FOR WASTE OR SOIL PIPES.

1,169,335.   Specification of Letters Patent.   Patented Jan. 25, 1916.

Application filed September 21, 1914. Serial No. 862,648.

*To all whom it may concern:*

Be it known that I, STEPHEN B. McMANAMIN, a subject of the King of Great Britain, residing in Fredericton, Province of New Brunswick, and Dominion of Canada, have invented new and useful Improvements in Clean-Out Devices for Waste or Soil Pipes, of which the following is a specification.

This invention relates to clean-out devices for waste pipes or traps, and it is the primary object of the invention to provide an improved device of this character which is simple and cheap in construction and efficient in use. Clean-out devices for waste pipes or soil pipes, usually located in a trap in said pipes, consist of a cover or cap for an opening therein, the opening being provided with internal screw threads with which external screw threads on the cover or cap coöperate to removably secure the cover therein, the cover being provided with a flange projecting laterally of the screw threaded portion and packing being interposed between said flange and the end of the opening to seal the cover and prevent leakage thereof. In this construction the screw threads of the cap and the coöperating screw threads of the opening in the pipe are exposed to the water therein with the consequent rusting and corroding of the same making it almost impossible to remove the cover, and very often requiring the renewal of the portion with the screw threaded opening and the cap. Furthermore, the packing, usually consisting of rubber, is exposed to the gases in the pipes with the consequent quick deterioration of the same and leakage.

It is the principal object of the present invention to overcome the above disadvantage and to provide a clean-out device in which the screw threaded connection of the cover thereto is not exposed to the waters in said pipe with the consequent rusting and corroding of the same, and in which the packing when utilized is not exposed to the gases from the pipes and the consequent deterioration thereof.

In the drawing accompanying and forming a part of the specification, Figure 1 is a side elevation of a waste pipe with a clean-out device calked therein illustrating an embodiment of my invention. Fig. 2 is a sectional side elevation of the clean-out device shown in Fig. 1. Fig. 3 is a sectional side elevation illustrating an embodiment of my invention applied to a soil pipe; and Fig. 4 is a sectional side elevation of a clean-out device adapted to be calked into a pipe and showing another form of my invention.

Similar characters of reference designate like parts throughout the different views of the drawing.

In Fig. 1 of the drawing I have shown my invention as applied in the usual trap 7 of a waste pipe and consisting of a tubular member 5 engaging and calked, as at 6, in an opening in said trap whereby access may be had to the trap for cleaning or otherwise through the member 5. The outer end of the member 5 is closed by a cover 8 having a screw connection therewith. To prevent access of the water in the trap to the screw threaded connection of the cover with the tubular member, the outer end of the tubular member has an annular recess 9, one wall 10 of which recess is formed by the inner portion of the tubular member and the outer wall by a lip or flange 11 projecting laterally and in a plane parallel with the sides of the member 5. This lip 11 extends beyond the wall 10 of the recess and is provided with internal screw threads. The cover 8 has external screw threads to have a screw threaded connection with the threads of the lip 11 and has an annular projecting or flange portion 12 to engage in the annular recess 9, a suitable packing 13, such as a rubber composition or fiber, being interposed between said flange and bottom of the recess 9. The cover adjacent and within the flange 12 has an annular portion which is adapted to lie contiguous to or abut against the end of the wall 10 of the recess. It will be obvious that by this construction the water in the pipe will have no access to the screw threaded connection of the cap or cover with the member 5, with the consequent rusting and corroding of the same and therefore the cover may be readily unscrewed from and screwed into the member 5 when it is desired to clean-out the trap or pipe. To facilitate the removal of the cover it is so constructed that means may be applied thereto to rotate the same, and in the present instance is shown as consisting of a shouldered boss 14 for the application of a wrench.

In Fig. 3 I have shown my invention applied directly to a soil pipe, said pipe being provided with a laterally projecting portion 15 having an opening communicating with the pipe. The annular recess 9 is located in said projecting portion, the outer wall 11 being internally screw threaded and projecting beyond the inner wall 10 the same as in the construction illustrated in Figs. 1 and 2.

In the form of the invention shown in Fig. 4, the annular recess 9 is formed by a flange 16 extending inwardly from the tubular member 5 and then in a plane parallel with the sides of the member 5 but does not extend to the end of the member 5. The member 5 adjacent its end is provided with screw threads in which the screw threads on the cover 8 coöperate to secure the cover thereto.

Variations may be resorted to within the scope of my invention.

Having thus described my invention I claim:

1. A clean-out device for pipes or traps, comprising in combination a tubular projecting portion having an opening communicating with the pipe or trap, an annular seat in the end of said portion, the outer wall of which seat extends beyond the inner wall and is provided with internal screw threads, and a cap to close said opening having a screw threaded portion to have screw threaded connection with the screw threads of the outer wall and having a portion to engage in the seat, substantially as and for the purpose specified.

2. A clean-out device for pipes or traps, comprising in combination a tubular projecting portion having an opening communicating with the pipe or trap, an annular recess in the end of said portion, the outer wall of which recess extends beyond the inner wall of the recess and provided with internal screw threads and the outer face of the inner wall of the recess being a continuation of the inner face of the tubular portion, and a cover to close said opening having a flange provided with a screw threaded portion to have screw threaded connection with the screw threads of the outer wall of the recess and an unthreaded portion to engage in the recess, and said cover being constituted to receive releasing means, substantially as and for the purpose specified.

3. A clean-out device for pipes or traps, comprising in combination a tubular projecting portion having an opening communicating with the pipe or trap, an annular recess in the end of said portion, the outer wall of which recess extends beyond the inner wall and is provided with internal screw threads, packing seated in the bottom of the recess, a cover to close said opening having a portion screw threaded to have screw threaded connection with the screw threads of the outer wall of the recess and an unthreaded portion to engage in the recess and with the packing therein, substantially as and for the purpose specified.

4. A device of the class specified, comprising in combination a tubular member adapted to be calked into a waste pipe or trap; an annular recess in the outer end of said member the inner face of the outer wall of which recess is threaded adjacent its outer end; and a cover to close the outer end of said member having a flange with external screw threads to have screw threaded connection with the screw threads of the annular recess and an unthreaded portion to engage in the unthreaded portion of the recess, substantially as and for the purpose specified.

5. The combination with a waste pipe or trap therein, of a tubular member to engage in an opening in the pipe or trap and communicate therewith; a lip adjacent the outer end of the member extending inwardly and then in a plane parallel with said member forming an annular recess the outer wall of which extends beyond the inner wall; internal screw threads on the outer wall of the recess packing seated in the bottom of the recess; a cover for the outer end of the tubular member having an annular screw threaded flange adapted to have connection with the screw threads of the outer wall and having an unthreaded portion to extend in the recess and engage the packing, and said cover having means for the application of a wrench, substantially as and for the purpose specified.

STEPHEN B. McMANAMIN.

Witnesses:
 F. W. BARBOUR,
 E. G. CRAWFORD.